May 4, 1948.  J. M. PATTERSON  2,440,698
MANUFACTURE OF FLIGHTED ARTICLES
Filed Nov. 23, 1945

INVENTOR.
JAMES M. PATTERSON
BY *Brunings and Sutherland*
ATTORNEYS

Patented May 4, 1948

2,440,698

UNITED STATES PATENT OFFICE 2,440,698

MANUFACTURE OF FLIGHTED ARTICLES

James M. Patterson, Jennings, Mo., assignor to Central Mine Equipment Company, St. Louis, Mo., a corporation of Missouri Application November 23, 1945, Serial No. 630,476

9 Claims. (Cl. 113—112)

This invention relates generally to the manufacture of flighted members such as screw conveyors, augers, and the like, and has particular reference to a method of welding a preformed flight on to a core. This invention is in part a continuation of my copending applications, Serial Nos. 553,822 and 580,757, filed, respectively, September 13, 1944, and March 3, 1945.

While it has heretofore been proposed to automatically weld flight strips to a core so as to make a flighted member, such arrangements have not met with entire satisfaction because of variations in the pitch of the flight. Such variations in the pitch frequently occur because they cannot be avoided, but on occasion an intentional variation in pitch of the flight may be encountered. Even in cases where a uniform pitch of the flight is desired, variations, buckles, and irregularities are practically impossible to avoid.

In the systems heretofore proposed for automatically welding a flight to a core, the movement of the welding head relative to the flight has been so inflexibly coordinated that the welding electrode was liable to completely miss the joint which it was intended to weld. The coordination of the welding head with the travel of the flight in such prior proposals has been unadaptable to situations where the flight in a given article was purposely of varied pitch.

The object of the present invention, generally stated, is to provide a process of making flighted articles by automatic welding and wherein the weld is properly and accurately positioned despite variations in pitch or other irregularities of the flight.

Other objects will become apparent to those skilled in the art when the following description is read in connection with the accompanying drawings, in which.

Figure 1:
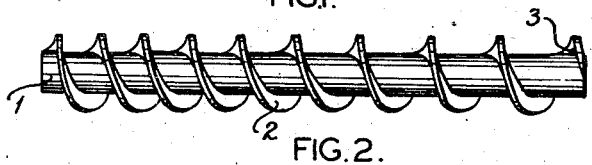
Figure 1 is a plan view of a flighted member ready for treatment according to the process of the present invention.

In accordance with the present invention, a flighted article may be formed from separate parts, being, respectively, a core, which may be either solid or tubular, and a preformed flight member. The flight member may be and usually is formed of a strip of metal wound helically, spirally, or substantially so. The present invention contemplates that the core member and the preformed flight member be preliminarily connected as by a spot of weld or a suitable clamp or holder and, with these parts thus preliminarily connected, the same are subjected to a process of welding to which the present invention is particularly addressed. The welding process contemplated by the present invention involves the provision of any suitable welding apparatus, preferably of the electrical type and preferably provided with an automatically-fed welding rod. Any one of a great variety of commercially available welding apparatus may be employed, but for the purpose of illustration, the invention will be disclosed with reference to electric welding. In accordance with the present invention, the welding apparatus is entracked upon the flight of the preliminarily connected flight and core with the welding point, i. e., the point in space at which the weld occurs, positioned at the juncture between the flight and the core. Preferably, the welding apparatus is initially entracked upon the flight ahead of the radius of the preliminary connection as by means of an adapter constituting a temporary extension of the flight. A particular feature of the present invention resides in the entracking of the welding apparatus upon the flight so that the welding point is guided by the flight in immediate adjacence to the increment being welded. With such an arrangement, the preliminarily connected core and flight may be rotated and provision made for relative longitudinal travel between the welding apparatus and the preliminarily connected core and flight member. In the embodiments shown in the drawing, the welding apparatus is mounted for longitudinal movement relative to the flight member, it being understood that the welding apparatus is held against rotational movement, but it will be understood that the welding apparatus may be held stationary and longitudinal movement of the flight member provided for.

A further feature of the present invention resides in the provision of a bath of flux so arranged that, immediately prior to the welding operation on any increment of the flight, that increment has passed through the bath of flux. In the embodiments shown in the drawing, the preliminarily connected core and flight member are arranged horizontally in a trough containing the bath of flux. The flight member need not be completely immersed in the bath of flux so long as the juncture between the flight and core immediately ahead of the point of weld is submerged in the bath. For example, the lower half of the core may be submerged in a flux bath. Especially advantageous results are achieved when the flight member is rotated in such direction that the flights tend to lift the flux toward the point of weld.

Referring now to the drawing, a core member 1 is assembled with a preformed flight strip 2, and these parts are preliminarily connected by a spot of weld 3. In the embodiment shown, the flight 2 is of non-uniform pitch, it being observed that the pitch at the right of Figure 1 is more than the pitch at the left thereof.

A suitable electric welding apparatus having a head 4, through which welding rod 5 is continuously and automatically fed (by conventional means, not shown), and preferably provided with automatic control means (not shown) for regulating the gap at the weld, is mounted upon an overhead track 6 for traverse longitudinally thereof. The core member 1 with its preliminarily connected flight 2 is received between a pair of aligned chucks 7 and 8, the former of which may be rotated by any suitable driving mechanism and the latter of which idles. In the embodiment shown in Figures 2 and 3, an adapter 31 having a flight part 32 and a connecting shank 33 is interposed between the right end of flighted member 1 and chuck 8. The flight part 32 of the adapter constitutes a continuation of flight 2, upon which the welding apparatus may be initially entracked to get a running start before the welding apparatus reaches the joint which it is intended to weld. Such an adapter may, if desired, be secured to or integral with chuck 8.

Figure 2:
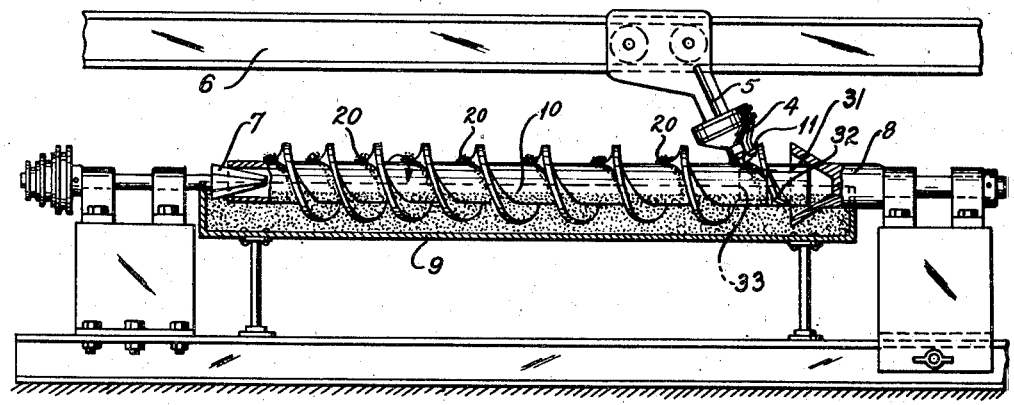
Figure 2 is a view in side elevation, part being shown in section, of an apparatus suitable for carrying out the process of the present invention.

As shown in the drawings, the member 1, when disposed between the chucks 7 and 8, is substantially horizontal and provided therearound is a trough 9 adapted to receive a bath of suitable flux or welding composition. As shown in Figure 2, the level of the flux 10 extends to slightly above the lower line of core 1.

Figure 3:
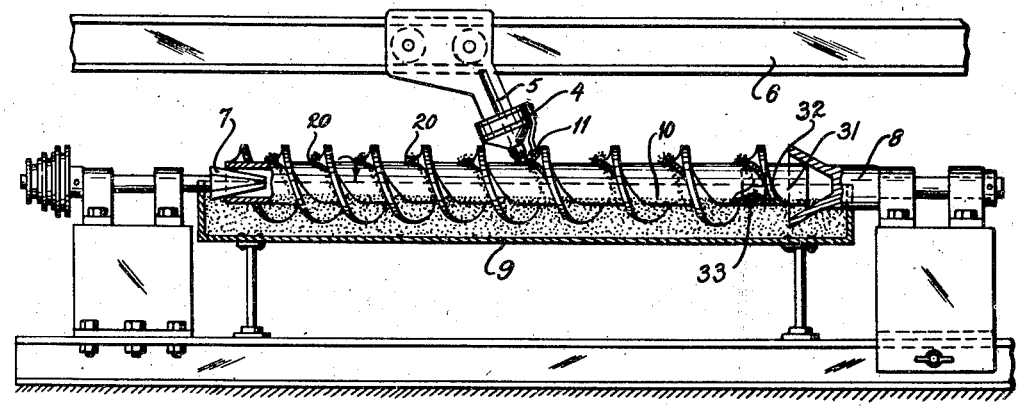
Figure 3 is a view corresponding to Figure 2, showing a different position of the parts.

In the embodiment shown in Figures 2 and 3, the head 4 of the welding apparatus is provided with a guide roller 11 adapted to engage the flight 2 at substantially the same radius as the welding operation is taking place at any instant during rotation of the core member 1 with flight 2. In the embodiment shown in Figures 2 and 3, the rotation takes place in the direction indicated by the arrow so that the advancing flight tends to push head 4 leftwardly. As the pitch of the flight changes, the point of weld is regulated by the entracked relation between roller 11 and the flight at the radius on which the welding operation is taking place at the moment and consequently the rate of longitudinal movement of the welding apparatus along track 6 is non-uniform in situations such as illustrated where the pitch of the flight varies. If desired, any suitable means may be provided for restraining movement of the welding apparatus along track 6 in response to the pushing force exerted by the rotating flight.

Figure 4:
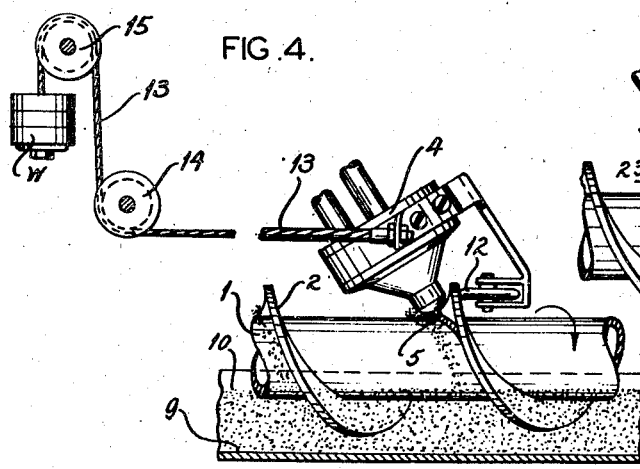
Figure 4 is a view similar to Figure 2, but showing a different form of apparatus.

In Figure 4 of the drawing, a different form of guiding apparatus is provided. In this instance, the welding head 4 is provided with a roller 12 embracing the opposite side of the flight 2 from that to which the welding point is addressed, but in this embodiment, as in the previous case, the point of engagement between the roller 12 and the flight 2 is substantially at the radius of the increment being welded at any given moment and consequently the welding head 4 is positioned with reference to the juncture to be welded in precise accord with the pitch of the flight at that increment. In the embodiment shown in Figure 4, the flight does not exert a pushing action against the welding head 4, but the latter is restrained to move leftwardly along its track as by means of a cable 13, to the remote end of which is connected a weight W. The cable travels over pulleys 14 and 15 and is so arranged that, when the welding head is at the extreme right position, the weight W is elevated sufficiently that the weight will still be free as the welding head 4 approaches its extreme leftward position.

Figure 5:
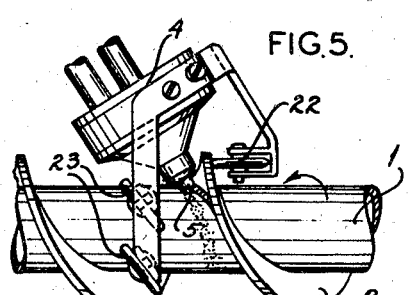
Figure 5 is a detail view showing a further form of apparatus suitable for use in the process of the present invention.

In the embodiment shown in Figure 5, the welding head 4 is provided with a roller 22 engaging the opposite side of the flight 2 from that to which the head is addressed, but again at substantially the same radius as the point of weld at any given instant. In this embodiment, the welding head 4 is additionally provided with a series of rollers 23 arranged to engage the cylindrical surface of core 1 at points where they will not interfere with the movement of flight 2, but will nevertheless maintain the head 4 in proper radial spaced relation with reference to the core 1, the longitudinal spacing between the head 4 and flight 2 being, as in the previous cases, controlled by roller 22 at the radius being operated upon. In this embodiment, it is contemplated that the welding apparatus be initially entracked upon the flight at the left hand thereof and pulled rightwardly upon rotation of flight 2 by forces transmitted through roller 22.

The type of flux or welding composition employed as the bath in the trough 9 will in any event depend upon the character of welding apparatus selected for the purpose. Particularly advantageous results have been achieved, however, with a bath constituted of a granular, fusible mineral welding material known in commerce as "Unionmelt" and which is represented to be made in accordance with United States Patent No. 2,043,960.

When such a granular flux is employed as the bath in trough 9, rotation of the flight in the direction indicated by the arrow in Figure 2 elevates the flux material out of the bath toward the point of weld and covers the latter, as shown at 20, and consequently avoids the necessity of concurrently depositing large quantities of the flux about the point of weld from a hopper above, in accordance with the usual practice involving such "Unionmelt" material. While to initiate the welding operation, or under other exceptional circumstances, it may be desirable to augment the automatic feeding of flux by otherwise depositing some flux material in a heap about the welding electrode, it will be understood that, after the flight has been rotated for 180°, the feed of flux to the point being welded from the bath below is continuous.

From the foregoing description, those skilled in the art will readily understand the operation and advantages of the present invention and realize the importance of controlling the position of the welding head in accordance with the position of the flight at the increment being welded, as herein described. Those skilled in the art will further recognize that the present invention provides an automatic continuous process of welding a flight without in any wise interfering with the natural tendency of the flight to creep during the welding operation and hence eliminating distortions in the flight due to inhibited creepage.

While several forms of apparatus have been disclosed as capable of carrying out the process of the present invention, it is recognized that other forms of apparatus may be utilized with equal facility and consequently it is to be distinctly understood that the present invention is not limited to the specific type of apparatus shown for the sake of illustration.

Having thus described the invention, what is claimed and desired to be secured by Letters Patent is:

1. The method of attaching a helical flight to a cylindrical core which comprises assembling and preliminarily connecting one end of the flight to the core, disposing the assembly horizontally with flights on the lower side immersed in a bath of flux, applying a translatable welding instrument to the juncture of the core and flight, and while the instrument is held against rotation, but free to translate axially of the assembly, rotating the assembly so that the welding instrument is behind the flight and the flight lifts flux out of the bath toward the welding instrument, during such rotation maintaining both the orientation of the instrument and its position behind the flight adjacent the advancing juncture, and progressively welding the juncture during such rotation.

2. The method of attaching a helical flight to a cylindrical core which comprises assembling and preliminarily connecting one end of the flight to the core, disposing the assembly horizontally with flights on the lower side immersed in a bath of flux, applying a translatable welding instrument to the juncture of the core and flight, and while the instrument is held against rotation, but free to translate axially of the assembly, rotating the assembly so that the welding instrument is behind the flight and the flight lifts flux out of the bath toward the welding instrument, during such rotation maintaining both the orientation of the instrument and its position behind the flight adjacent the advancing juncture, and progressively welding the juncture during such rotation while the flight beyond the weld is free to creep longitudinally of the core.

3. The method of attaching a helical flight to a cylindrical core which comprises assembling and preliminarily connecting one end of the flight to the core, disposing the assembly horizontally with the juncture between the core and the flights on the lower side immersed in a bath of flux, applying a translatable welding instrument to the juncture of the core and flight, and while the instrument is held against rotation, but free to translate axially of the assembly, rotating the assembly so that the welding instrument is behind the flight and the flight lifts flux out of the bath toward the welding instrument, during such rotation maintaining both the orientation of the instrument and its position behind the flight adjacent the advancing juncture, and progressively welding the juncture during such rotation.

4. The method of attaching a helical flight to a cylindrical core which comprises assembling and preliminarily connecting one end of the flight to the core, disposing the assembly horizontally with flights on the lower side immersed in a bath of flux, entracking a translatable welding instrument on the flight with the welding point thereof addressed to the juncture of the core and flight, and while the instrument is held against rotation, but free to translate axially of the assembly, rotating the assembly so that the welding instrument is behind the flight and the flight lifts flux out of the bath toward the welding instrument, during such rotation maintaining both the orientation of the instrument and its position behind the flight adjacent the advancing juncture, and progressively welding the juncture during such rotation.

5. The method of attaching a helical flight to a cylindrical core which comprises assembling and preliminarily connecting one end of the flight to the core, applying a translatable welding instrument to the juncture of the core and flight, said instrument having a guide part, engaging the guide part with the wall of the flight at substantially the same radius as that to which the welding instrument is addressed to control translatory movement of the welding instrument in accordance with the pitch of the flight in the region of the radius being operated upon, rotating the core and flight while the welding instrument is held against rotation and guided to follow the flight axially of the core, and concurrently with such rotation progressively welding the juncture between the core and flight.

6. The method of attaching a helical flight to a cylindrical core which comprises assembling and preliminarily connecting one end of the flight to the core, positioning a welding instrument to weld the juncture between the core and flight, mechanically gauging the welding instrument from the side wall of the flight at substantially the same radius as that to which the welding instrument is addressed, rotating the assembly while the so mechanically gauged welding instrument is held against rotation and while the core and welding instrument are free to move relative to each other in an axial direction, and as the welding instrument progresses along the flight in gauged relation thereto welding the juncture between the flight and the core.

7. The method of attaching a helical flight to a cylindrical core which comprises assembling and preliminarily connecting one end of the flight to the core, submerging part of the flight in a bath of flux, positioning a welding instrument to weld the juncture between the core and flight, mechanically gauging the welding instrument from the side wall of the flight at substantially the same radius as that to which the welding instrument is addressed, rotating the assembly while the so mechanically gauged welding instrument is held against rotation and while the core and welding instrument are free to move relative to each other in an axial direction, and as the welding instrument progresses along the flight in gauged relation thereto welding the juncture between the flight and the core.

8. The method of attaching a helical flight to a cylindrical core which comprises assembling and preliminarily connecting one end of the flight to the core, submerging part of the flight in a bath of flux, positioning a welding instrument to weld the juncture between the core and flight, mechanically gauging the welding instrument from the side wall of the flight at substantially the same radius as that to which the welding instrument is addressed, rotating the assembly while the so mechanically gauged welding instrument is held against rotation and while the core and welding instrument are free to move relative to each other in an axial direction, such rotation being in such direction that the portion of the flight submerged in flux moves flux from the bath toward the welding instrument, and as the welding instrument progresses along the flight in gauged relation thereto welding the juncture between the flight and the core.

9. The method of attaching a preformed helical flight to a cylindrical core which comprises mounting the flight about the core, preliminarily connecting the flight to the core adjacent one end, arranging the preliminarily connected core and flight for rotation while held against longitudinal movement, arranging welding apparatus for translation axially of the core with the welding point thereof addressed to the juncture between the flight and the core, entracking the welding apparatus on the flight adjacent the preliminary connection and in substantial radial and longitudinal alignment with the welding point, rotating the core and flight while the welding apparatus is held against rotation but is free to translate axially of the core as the flight advances, said rotation being in a direction such as to drive the welding apparatus axially away from the point of preliminary connection at a rate determined solely by the pitch of the preformed flight adjacent the point of welding at any increment of time, and concurrently with such rotation welding the advancing juncture between the flight and the core.

JAMES M. PATTERSON.

REFERENCES CITED

The following references are of record in the file of this patent:

UNITED STATES PATENTS

| Number | Name | Date |
| --- | --- | --- |
| 499,389 | Malmfelt | June 13, 1893 |
| 1,539,383 | Bienenstok | May 26, 1925 |
| 1,818,492 | McFarland | Aug. 11, 1931 |
| 2,039,690 | Trainer | May 5, 1936 |

FOREIGN PATENTS

| Number | Country | Date |
| --- | --- | --- |
| 6,326 | Great Britain | 1910 |